US012771588B2

(12) United States Patent
Gulati et al.

(10) Patent No.: US 12,771,588 B2
(45) Date of Patent: Oct. 20, 2026

(54) ORTHOGONAL FREQUENCY DIVISION MULTIPLEXING BASED RADAR

(71) Applicant: QUALCOMM Incorporated, San Diego, CA (US)

(72) Inventors: Kapil Gulati, Belle Mead, NJ (US); Junyi Li, Greentown, PA (US); Stelios Stefanatos, San Diego, CA (US); Preeti Kumari, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 18/713,879

(22) PCT Filed: Nov. 30, 2022

(86) PCT No.: PCT/US2022/080665
§ 371 (c)(1),
(2) Date: May 28, 2024

(87) PCT Pub. No.: WO2023/146702
PCT Pub. Date: Aug. 3, 2023

(65) Prior Publication Data

US 2025/0039032 A1 Jan. 30, 2025

(30) Foreign Application Priority Data

Jan. 31, 2022 (GR) ................................ 0220100090

(51) Int. Cl.
*H04L 27/26* (2006.01)

(52) U.S. Cl.
CPC ...... *H04L 27/2657* (2013.01); *H04L 27/2613* (2013.01); *H04L 27/26538* (2021.01)

(58) Field of Classification Search
CPC .............. G01S 13/0209; H04J 13/0062; H04L 27/2613; H04L 27/26538; H04L 27/2657; H04L 27/2675
See application file for complete search history.

(56) References Cited

U.S. PATENT DOCUMENTS

2012/0068867 A1 3/2012 Pagnanelli
2019/0219683 A1 7/2019 Fang
(Continued)

FOREIGN PATENT DOCUMENTS

WO WO-2020150283 A1 7/2020

OTHER PUBLICATIONS

CATT: "Further Discussion on SRS Transmission", 3GPP TSG RAN WG1 AH_NR meeting, R1-1700234, 3rd Generation Partnership Project (3GPP), Mobile Competence Centre, 650, Route Des Lucioles, F-06921 Sophia-Antipolis Cedex, France, vol. RAN WG1, No. Spokane, USA, Jan. 16, 2017-Jan. 20, 2017, 5 Pages, Jan. 16, 2017, XP051207772, Section 2.5.
(Continued)

*Primary Examiner* — David B Lugo
(74) *Attorney, Agent, or Firm* — Harrity & Harrity, LLP

(57) ABSTRACT

Various aspects of the present disclosure generally relate to wireless communication. In some aspects, a wireless device may transmit an orthogonal frequency division multiplexing (OFDM) signal on K subsets of N subcarriers, where the signal includes a sequence of modulated symbols for each subset of the K subsets that is distinct for each subset. The wireless device may receive a reflected OFDM signal that corresponds to the OFDM signal. The wireless device may process the reflected OFD.M signal with K mixers, where mixer frequencies for the K mixers are separated by N subcarriers spacing, to form K portions of a range spectrum from the reflected OFDM signal. The wireless device may
(Continued)

combine the K portions to form the range spectrum. Numerous other aspects are described.

30 Claims, 8 Drawing Sheets

(56) References Cited

U.S. PATENT DOCUMENTS

2021/0385035 A1* 12/2021 Ghozlan ............. H04J 13/0062
2022/0158755 A1* 5/2022 Lee ......................... H04L 1/007

OTHER PUBLICATIONS

International Search Report and Written Opinion—PCT/US2022/080665—ISA/EPO—Mar. 28, 2023.

* cited by examiner

ORTHOGONAL FREQUENCY DIVISION MULTIPLEXING BASED RADAR

CROSS-REFERENCE TO RELATED APPLICATIONS

This Patent Application is a 371 national stage of PCT Application No. PCT/US2022/080665 filed on Nov. 30, 2022, entitled "ORTHOGONAL FREQUENCY DIVISION MULTIPLEXING BASED RADAR," which claims priority to Greece Nonprovisional patent application No. 20220100090, filed on Jan. 31, 2022, entitled "ORTHOGONAL FREQUENCY DIVISION MULTIPLEXING BASED RADAR," which are hereby expressly incorporated by reference herein.

FIELD OF THE DISCLOSURE

Aspects of the present disclosure generally relate to wireless communication and to techniques and apparatuses for a radar that uses an orthogonal frequency division multiplexing signal.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a wireless device. The method may include transmitting an orthogonal frequency division multiplexing (OFDM) signal on K subsets of N subcarriers, where the signal includes a sequence of modulated symbols for each subset $K_i$ of the K subsets, the sequence of modulated symbols is distinct for each subset $K_i$, and i is one of K sequences. The method may include receiving a reflected OFDM signal that corresponds to the OFDM signal. The method may include processing the reflected OFDM signal with K mixers, where mixer frequencies for the K mixers are separated by N subcarriers spacing, to form K portions of a range spectrum from the reflected OFDM signal. The method may include combining the K portions to form the range spectrum.

Some aspects described herein relate to a wireless device for wireless communication. The wireless device may include a memory and one or more processors coupled to the memory. The one or more processors may be configured to transmit an OFDM signal on K subsets of N subcarriers, where the signal includes a sequence of modulated symbols for each subset $K_i$ of the K subsets, the sequence of modulated symbols is distinct for each subset $K_i$, and i is one of K sequences. The one or more processors may be configured to receive a reflected OFDM signal that corresponds to the OFDM signal. The one or more processors may be configured to process the reflected OFDM signal with K mixers, where mixer frequencies for the K mixers are separated by N subcarriers spacing, to form K portions of a range spectrum from the reflected OFDM signal. The one or more processors may be configured to combine the K portions to form the range spectrum.

Some aspects described herein relate to a non-transitory computer-readable medium that stores a set of instructions for wireless communication by a wireless device. The set of instructions, when executed by one or more processors of the wireless device, may cause the wireless device to transmit an OFDM signal on K subsets of N subcarriers, where the signal includes a sequence of modulated symbols for each subset $K_i$ of the K subsets, the sequence of modulated symbols is distinct for each subset $K_i$, and i is one of K sequences. The set of instructions, when executed by one or more processors of the wireless device, may cause the wireless device to receive a reflected OFDM signal that corresponds to the OFDM signal. The set of instructions, when executed by one or more processors of the wireless device, may cause the wireless device to process the reflected OFDM signal with K mixers, where mixer frequencies for the K mixers are separated by N subcarriers spacing, to form K portions of a range spectrum from the reflected OFDM signal. The set of instructions, when executed by one or more processors of the wireless device, may cause the wireless device to combine the K portions to form the range spectrum.

Some aspects described herein relate to an apparatus for wireless communication. The apparatus may include means for transmitting an OFDM signal on K subsets of N subcarriers, where the signal includes a sequence of modulated symbols for each subset $K_i$ of the K subsets, the sequence of modulated symbols is distinct for each subset $K_i$, and i is one of K sequences. The apparatus may include means for receiving a reflected OFDM signal that corresponds to the OFDM signal. The apparatus may include means for processing the reflected OFDM signal with K mixers, where mixer frequencies for the K mixers are separated by N subcarriers spacing, to form K portions of a range spectrum from the reflected OFDM signal. The apparatus may include means for combining the K portions to form the range spectrum.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
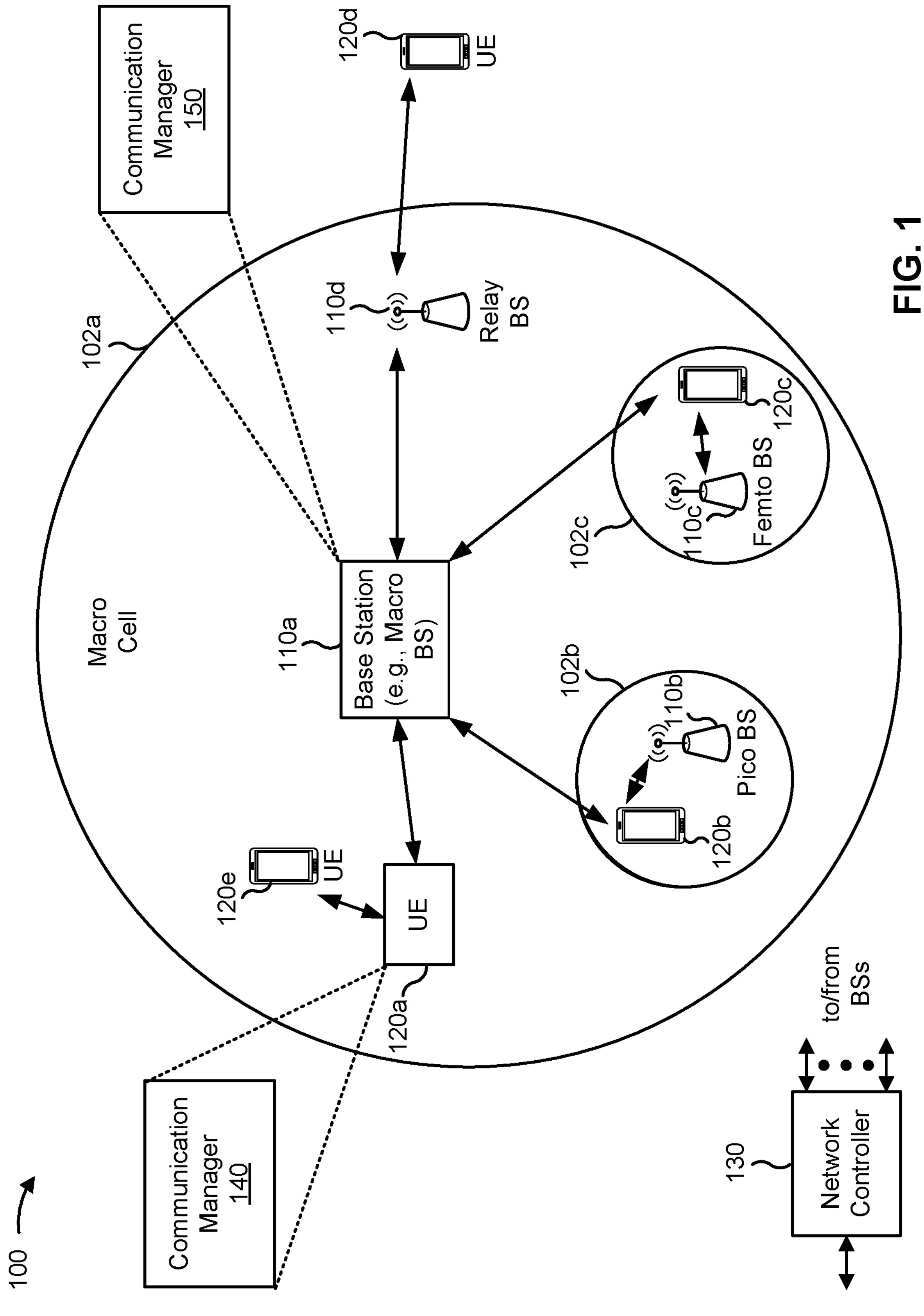
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*c*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrow band IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a. FR4-1, and/or FR5) may be modified, and techniques described herein are applicable to those modified frequency ranges.

In some aspects, a wireless device (e.g., a UE 120) may include a communication manager 140 or 150. As described in more detail elsewhere herein, the communication manager 140 or 150 may transmit an orthogonal frequency division multiplexing (OFDM) signal on K subsets of N subcarriers, where the signal includes a sequence of modulated symbols for each subset $K_i$ of the K subsets, where the sequence of modulated symbols is distinct for each subset $K_i$, and where i corresponds to one of K sequences: receive a reflected OFDM signal that corresponds to the OFDM signal. The communication manager 140 or 150 may process the reflected OFDM signal with K mixers, where mixer frequencies for the K mixers are separated by N subcarriers spacing, to form K portions of a range spectrum from the reflected OFDM signal. The communication manager 140 or 150 may combine the K portions to form the range spectrum. Additionally, or alternatively, the communication manager 140 or 150 may perform one or more other operations described herein.

As indicated above. FIG. 1 is provided as an example. Other examples may differ from what is described with regard to FIG. 1.

Figure 2:
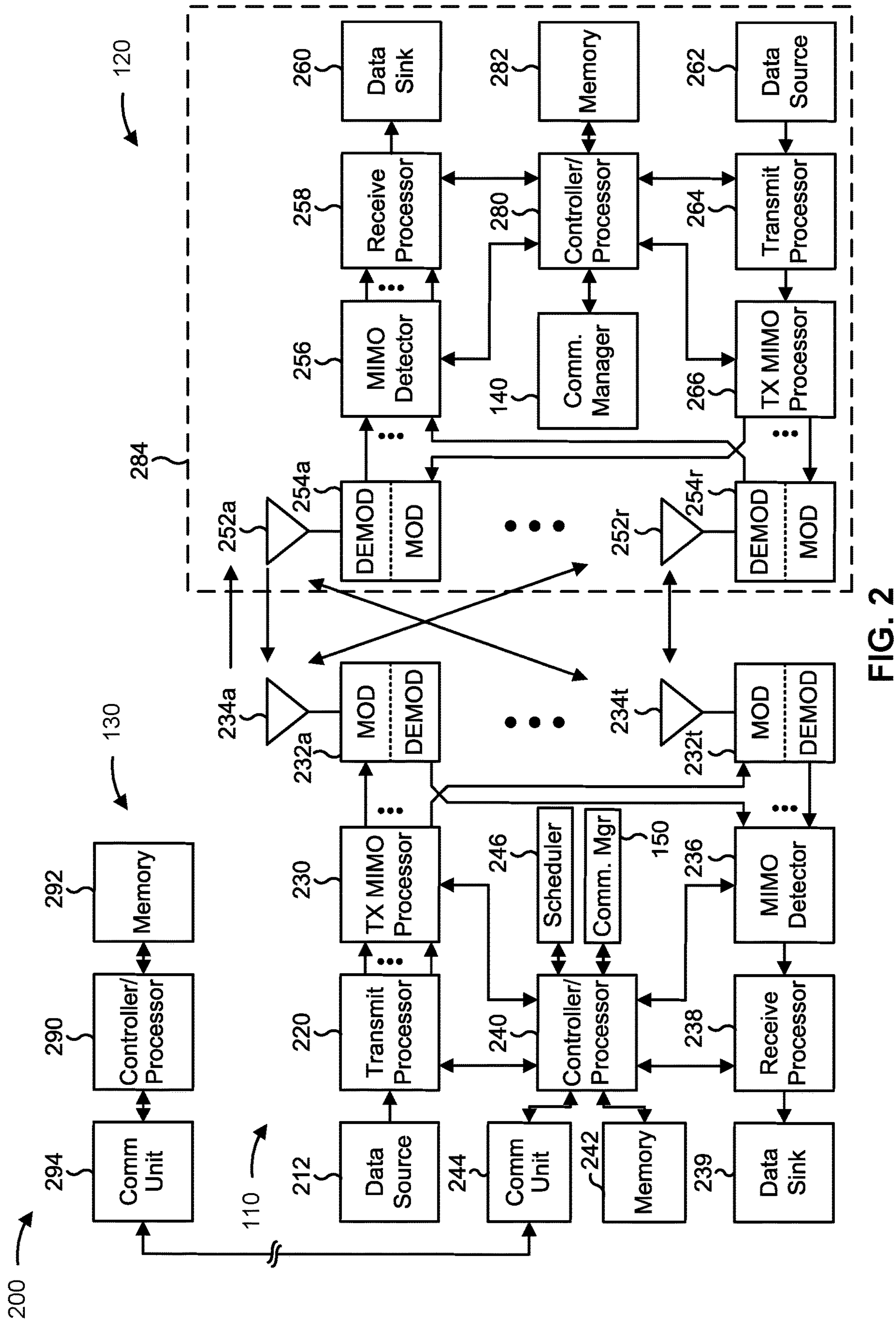
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, down-convert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-8).

The controller/processor 240 of the base station 110, the controller/processor 280 of the UE 120, and/or any other component(s) of FIG. 2 may perform one or more techniques associated with OFDM-based radar, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, and/or other processes as described herein. In some examples, executing instructions may include running the instructions, converting the instructions, compiling the instructions, and/or interpreting the instructions, among other examples.

In some aspects, a wireless device (e.g., a UE 120, a base station 110) includes means for transmitting an OFDM signal on K subsets of N subcarriers, where the signal includes a sequence of modulated symbols for each subset $K_i$ of the K subsets, the sequence of modulated symbols is distinct for each subset $K_i$, and i corresponds to one of K sequences: means for receiving a reflected OFDM signal that corresponds to the OFDM signal: means for processing the reflected OFDM signal with K mixers, where mixer frequencies for the K mixers are separated by N subcarriers spacing, to form K portions of a range spectrum from the reflected OFDM signal; and/or means for combining the K portions to form the range spectrum. In some aspects, the means for the wireless device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the wireless device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
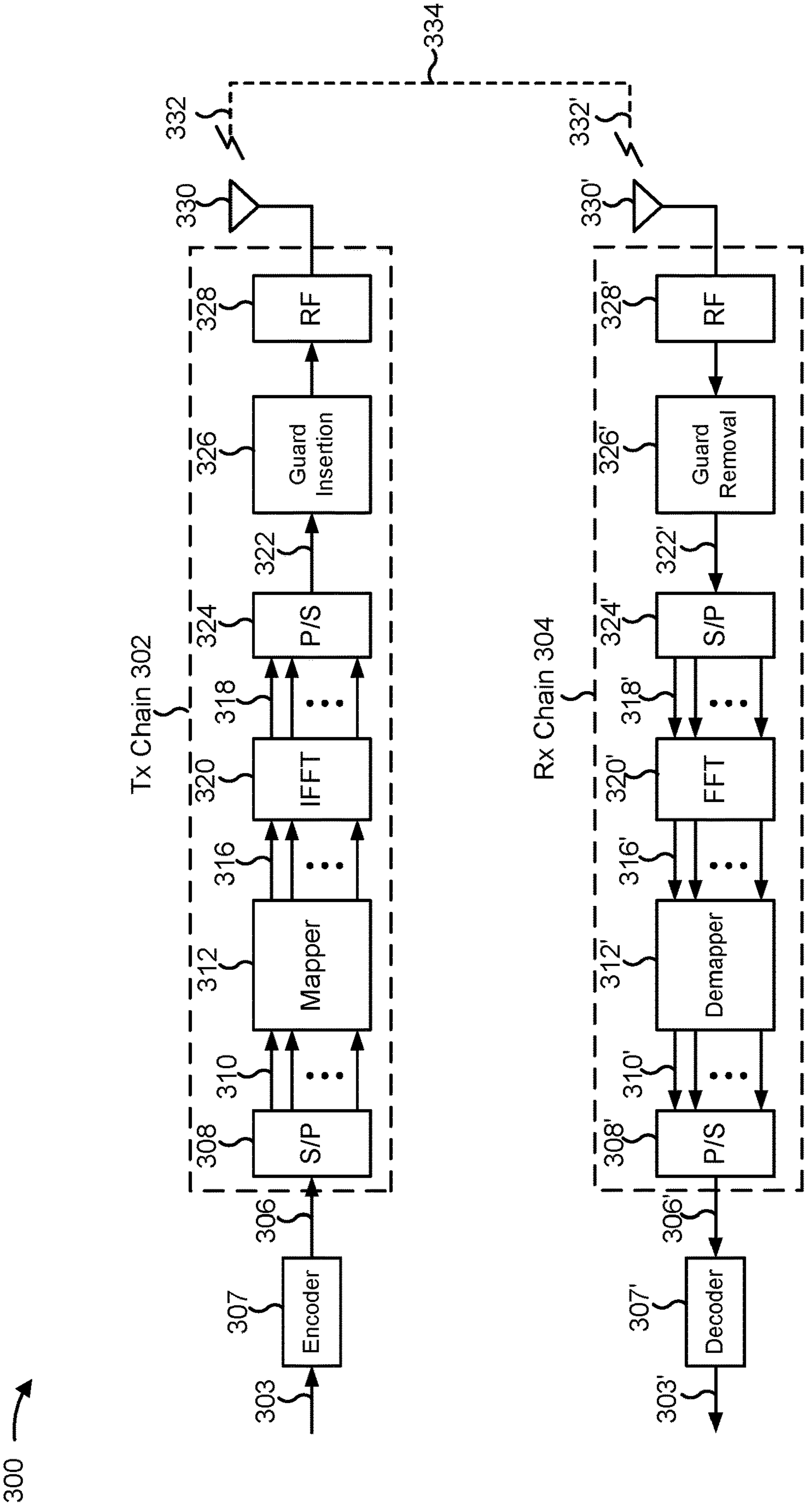
FIG. 3 is a diagram illustrating an example of a transmit chain and a receive chain of a UE, in accordance with the present disclosure.

FIG. 3 is a diagram illustrating an example 300 of a transmit (Tx) chain 302 and a receive (Rx) chain 304 of a UE 120, in accordance with the present disclosure. In some aspects, one or more components of Tx chain 302 may be implemented in transmit processor 264, TX MIMO processor 266, modem 254, and/or controller/processor 280, as described above in connection with FIG. 2. In some aspects, Tx chain 302 may be implemented in UE 120 for transmitting data 306 (e.g., uplink data, an uplink reference signal, and/or uplink control information) to base station 110 on an uplink channel.

An encoder 307 may alter a signal (e.g., a bitstream) 303 into data 306. Data 306 to be transmitted is provided from encoder 307 as input to a serial-to-parallel (S/P) converter 308. In some aspects, S/P converter 308 may split the transmission data into M parallel data streams 310.

The M parallel data streams 310 may then be provided as input to a mapper 312. Mapper 312 may map the M parallel data streams 310 onto M constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 312 may output M parallel symbol streams 316, each symbol stream 316 corresponding to one of M orthogonal subcarriers of an inverse fast Fourier transform (IFFT) component 320. These M parallel symbol streams 316 are represented in the frequency domain and may be converted into M parallel time domain sample streams 318 by IFFT component 320.

In some aspects, M parallel modulations in the frequency domain correspond to M modulation symbols in the frequency domain, which are equal to M mapping and M-point IFFT in the frequency domain, which are equal to one (useful) OFDM symbol in the time domain, which are equal to M samples in the time domain. One OFDM symbol in the time domain, Ms, is equal to Mop (the number of guard samples per OFDM symbol)+M (the number of useful samples per OFDM symbol).

The M parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of guard insertion component 326 may then be upconverted to a desired transmit frequency band by a radio frequency (RF) front end 328. An antenna 330 may then transmit the resulting signal 332.

In some aspects, Rx chain 304 may utilize OFDM/OFDMA. In some aspects, one or more components of Rx chain 304 may be implemented in receive processor 258, MIMO detector 256, modem 254, and/or controller/processor 280, as described above in connection with FIG. 2. In some aspects, Rx chain 304 may be implemented in UE 120 for receiving data 306 (e.g., downlink data, a downlink reference signal, and/or downlink control information) from base station 110 on a downlink channel.

A transmitted signal 332 is shown traveling over a wireless channel 334 from Tx chain 302 to Rx chain 304. When a signal 332' is received by an antenna 330', the received signal 332' may be down-converted to a baseband signal by an RF front end 328'. A guard removal component 326' may then remove the guard interval that was inserted between OFDM/OFDMA symbols by guard insertion component 326.

The output of guard removal component 326' may be provided to an S/P converter 324'. The output may include an OFDM/OFDMA symbol stream 322', and S/P converter 324' may divide the OFDM/OFDMA symbol stream 322' into M parallel time-domain symbol streams 318', each of which corresponds to one of the M orthogonal subcarriers. A fast Fourier transform (FFT) component 320' may convert the M parallel time-domain symbol streams 318' into the frequency domain and output M parallel frequency-domain symbol streams 316'.

A demapper 312' may perform the inverse of the symbol mapping operation that was performed by mapper 312, thereby outputting M parallel data streams 310'. A P/S converter 308' may combine the M parallel data streams 310' into a single data stream 306'. Ideally, data stream 306' corresponds to data 306 that was provided as input to Tx chain 302. Data stream 306' may be decoded into a decoded data stream 303' by decoder 307'.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

Figure 4:
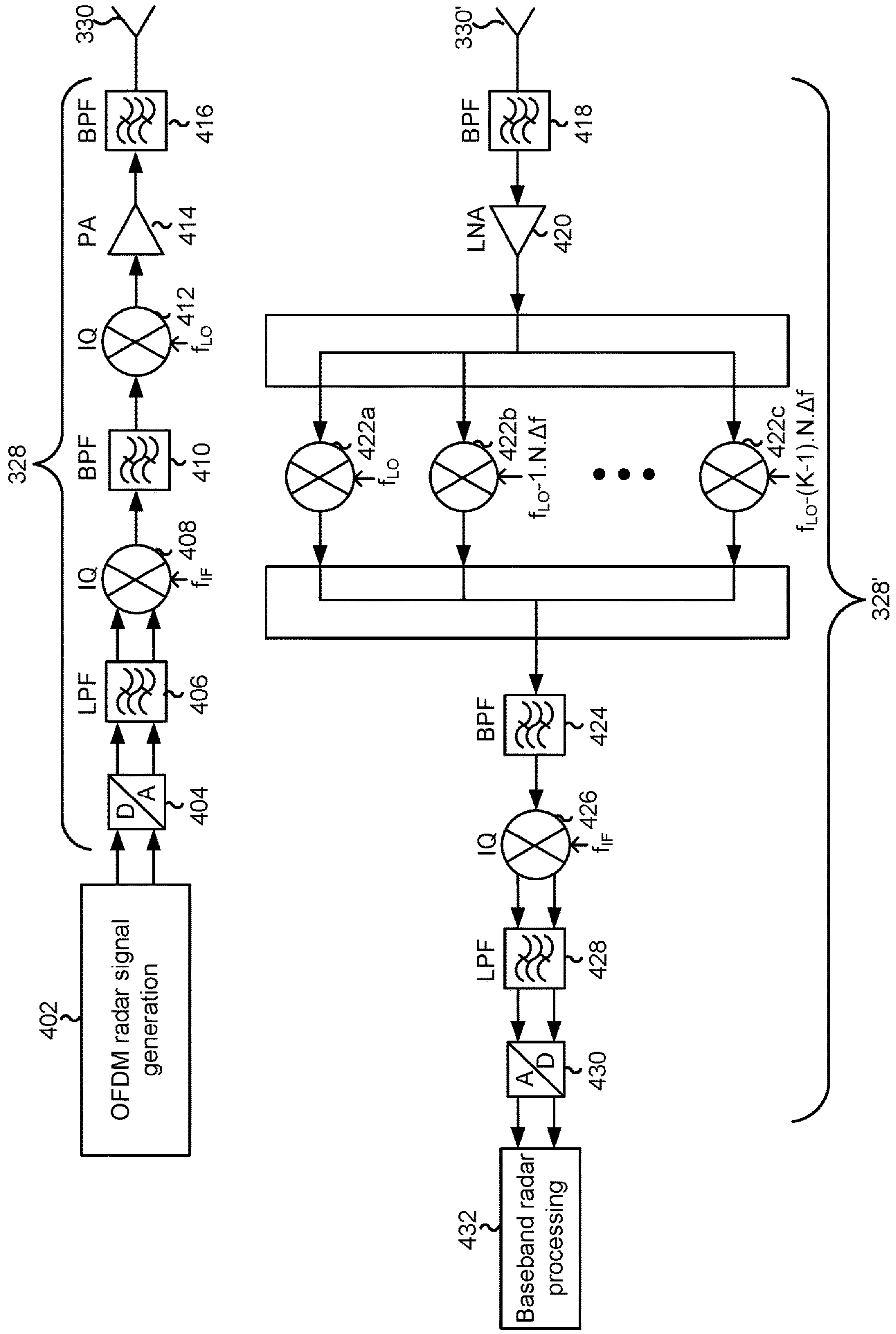
FIG. 4 is a diagram illustrating radio frequency (RF) front ends, in accordance with the present disclosure.

FIG. 4 is a diagram illustrating RF front ends, in accordance with the present disclosure. Example 400 shows more details for RF front ends 328 and 328' shown in FIG. 3.

OFDM-based radar waveforms may be used for joint communication and radar (JCR) applications in multi-user interference scenarios. JCR may use an OFDM-based waveform to utilize commonality between mmW communications and mmW radar to enable waveform, spectrum, and hardware reuse. However, a challenge for OFDM-based radar (or any other digital waveform) compared to frequency modulated continuous wave (FMCW)-based radar is a requirement to have high-sampling rate digital-to-analog converters (DACs) and analog-to-digital converters (ADCs). For example, to achieve a range resolution of about 15 centimeters (cm), bandwidth requirements may be 1 GHz and thus OFDM-based radar may need sampling rates of about 1 gigasample per second (GSPS). Existing radars may support a maximum bandwidth of 1-4 GHz such that 1-4 GSPS are used for OFDM-radar. OFDM-based radar may also expect a high angular resolution and thus may use multiple receive chains for digital receiver beamforming. For example, existing radar azimuth resolution may be about 1 degree and thus about 120 antenna elements (physical or virtual) may be needed. In other words, high-sampling rate ADCs and a large quantity of receive chains (e.g., 16-120) are expected if digital beamforming is to be used in an OFDM-based radar system. This leads to high power consumption, high costs, and large equipment spaces.

Some solutions for combating high sampling rate requirements for OFDM-based radar involve lower resolutions or lower sampling rates. For example, one low-sampling rate solution includes stepped-OFDM, which processes a subset of subcarriers at a time (e.g., in a symbol). The subsets of carriers may cover all of the subcarriers over multiple symbols within a symbol block. While the stepped-OFDM may reduce the sampling rate by a reduction factor, the stepped-OFDM may also reduce a maximum unambiguous Doppler velocity by the same reduction factor. For example, if M subsets of subcarriers form the full bandwidth of subcarriers, the maximum unambiguous Doppler velocity is reduced by a factor of M. The Doppler effect involves a shift in frequency due to movement, such as a transmitter moving toward or away from a receiver (or similar movement by the receiver). A maximum Doppler velocity is a maximum velocity for which a radar receiver is able to handle a shift in frequency caused by the velocity of the movement. A maximum unambiguous Doppler velocity is a maximum velocity that may occur whether the velocity is absolute or in relation to a velocity of another object (unambiguous as to whether the velocity is absolute or relative). If the maximum unambiguous Doppler velocity is reduced by the factor of M, the sampled signal may experience some distortion depending on the velocity of the tracked object. Signal distortion or processing inaccuracy may waste processing resources, waste signaling resources, and introduce safety issues.

One solution for low-rate DACs/ADCs involves using a frequency comb pattern, where the modulated symbols of the signal are distributed in subcarriers that form teeth of the comb pattern. The signal in the subcarrier in the teeth of the comb pattern is processed and the signal in subcarriers in between the teeth is not processed. However, this may reduce the maximum unambiguous range (distance between radar and reflective surface whether absolute or relative) of the radar by the same factor by which the comb pattern reduces the sample rate. There may be distortion in the processing of signals that are reflected from a distance beyond the maximum range.

According to various aspects described herein, an OFDM-based radar system may use multiple mixers (e.g., in-phase/quadrature (IQ) mixers) in the RF receive chain to reduce the sampling rate while maintaining the same radar resolution and the same maximum unambiguous performance in range. Doppler, and angular domains as compared to high-sampling rate OFDM-based radar. For example, a wireless device of the OFDM-based radar system may transmit an OFDM signal on K subsets of N subcarriers. The signal may include a sequence of modulated symbols for each subset $K_i$ of the K subsets, where each sequence of modulated symbols is distinct for each subset $K_i$, and where i=1, . . . , K for K sequences. That is, each sequence may be a sequence of modulated symbols that is distinct from the other sequences of modulated symbols. In some aspects, each sequence may include, for example, comb-mapped symbols, where the modulated symbols of the sequence are mapped to frequencies or symbols in a comb pattern. In some aspects, each sequence may be based at least in part on a Zadoff-Chu sequence, which is a complex-valued mathematical sequence that, when applied to a signal, gives rise to a new signal of constant amplitude.

The wireless device (or another receiver) may receive the reflected OFDM signal that corresponds to the OFDM signal that was transmitted. The wireless device may process the reflected OFDM signal with K mixers, where mixer frequencies for the K mixers are separated by N subcarriers spacing, to form K portions of a range spectrum from the reflected OFDM signal. The wireless device may use a mixer for each subset $K_i$ of the K subsets. Each portion of the K portions of the range spectrum is embedded over (multiplied with) the sequence of modulated symbols transmitted over the N subcarriers in the respective subset $K_i$. The mixers may be IQ demodulators. The wireless device may combine the K portions to form the range spectrum. In other words, the wireless device may use a lower sampling rate to obtain a sampled signal while preserving the range spectrum that would otherwise be reduced by a factor of K. As a result, the wireless device preserves the maximum unambiguous Doppler velocity and/or the maximum unambiguous range, and the signal processing is not degraded. Note that the range (or delay) of a target results in a phase ramp in frequency, and the wireless device may estimate and observe the phase ramp to then estimate the delay of the target. This is why the wireless device determines the target range spectrum (delay spectrum).

To achieve the transmit signal with the K subsets, the wireless device may have an RF front end, such as shown by RF front end 328 in FIG. 4. RF front end 328 is an example of an RF front end for transmitting an OFDM signal generated by OFDM signal generator 402 for a radar application. RF front end 328 may include DACs 404 that receive the OFDM signal and output an analog signal. The DACs 404 may be high-sampling rate DACs or low-sampling rate DACs (with a higher quantity of transmit chains than used for high-sampling rate DACs). The sampling rate may be B samples per second. RF front end 328 may also include a low-pass filter (LPF) 406 that filters the analog signal to form a filtered signal. An IQ component 408 may modulate the filtered signal with in-phase (I) and quadrature (Q) inputs to form a quadrature signal. A band-pass filter (BPF) 410 may filter the quadrature signal, which may be modulated by another IQ component 412. The modulated signal may then be amplified by a power amplifier (PA) 414 and filtered with another BPF 416 before being output to the antenna 330. The transmit signal may have a bandwidth B Hz. Note that B Hz bandwidth may need a Nyquist sampling rate of B samples per second (=2×max_frequency=2×B/2=B).

The transmit signal may be reflected off of a surface and return as a receive signal (reflected OFDM signal). To receive and process the receive signal while preserving the maximum unambiguous Doppler velocity and/or the maximum unambiguous range, the wireless device may also have an RF front end, such as shown by RF front end 328' in FIG. 4. RF front end 328' is an example of an RF front end for receiving the receive signal from antenna 330'. The receive signal may be filtered by BPF 418 and amplified by low noise amplifier (LNA) 420. The amplified signal may span the K subsets of N subcarriers across bandwidth B (as described above for the transmit signal). Each subset may pass through one of multiple IQ mixers 422. For example, a first subset may pass through a first IQ mixer 422*a*, a second subset may pass through a second mixer 422*b*, and so forth until the Kth subset passes through IQ mixer 422*c*. The subsets may pass through BPF 424 and may be further demodulated by IQ component 426. The demodulated signal may pass through LPF 428. The filtered signal may be converted to samples by ADCs 430, which may be low-sampling rate ADCs as there may be a great quantity of ADCs (e.g., up to 128 ADCs to achieve an angular resolution of 1 degrees) with fully digital or hybrid receiver beamforming. Processing component 432 may process the filtered signal for the radar application. The multiple mixers may reduce the sample rate by a factor of K as compared to Nyquist sampling. The receiving ADCs 430 may operate at B/K samples per second.

In some aspects, the RF front ends 328 and 328' may be used with a higher quantity of receive ports than transmit ports. For example, the transmit signal may be analog beamformed in the field-of-view (e.g., with one or two transmit ports), while the receiver may use 16-120 receive ports and digital band-pass filters for high angular resolutions.

As indicated above, FIG. 4 is provided as an example. Other examples may differ from what is described with regard to FIG. 4.

Figure 5:
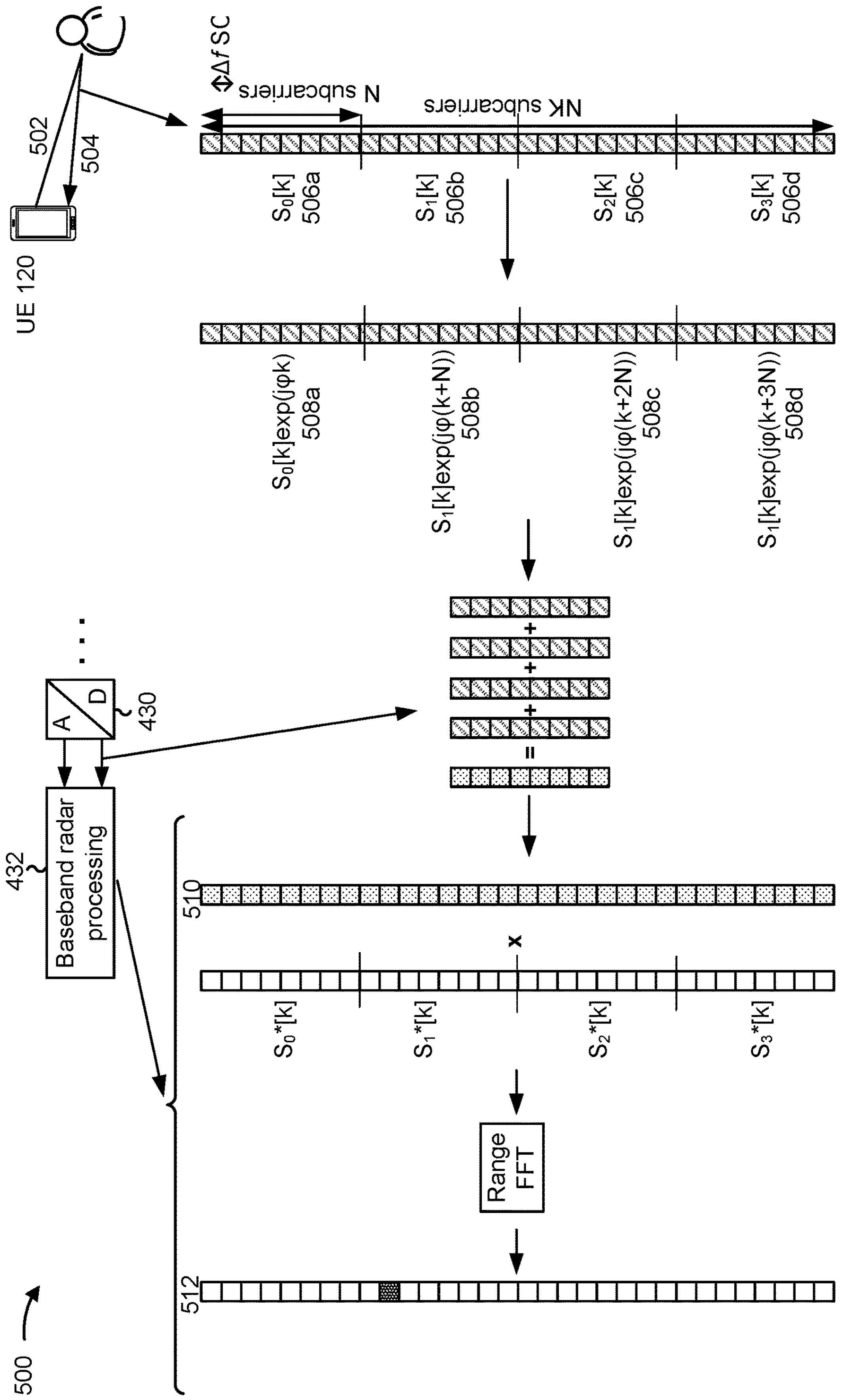
FIG. 5 is a diagram illustrating an example of processing a signal used for orthogonal frequency division multiplexing (OFDM)-based radar, in accordance with the present disclosure.

FIG. 5 is a diagram illustrating an example 500 of processing a signal used for OFDM-based radar, in accordance with the present disclosure.

A wireless device (e.g., a UE 120) may generate a transmit signal 502 that may be divided into K subsets of subcarriers, where each subset has N subcarriers. The K subsets may combine for a total of NK (N×K) subcarriers with a subcarrier spacing of Δf. That is, the transmit signal 502 may span a total RF transmission signal bandwidth B=NKΔf.

Each subset may be represented as K, where i is one of K sequences (e.g., i=1, . . . , K or 0, . . . . K−1). Each subset $K_i$ may include a sequence of modulated symbols that is distinct for the subset $K_i$ and that may be represented by $S_i[k]$ such that the signal for each of the N subcarriers within the subset $K_i$ may be represented as $S[k]e^{j2\pi\Delta fkt}$ for time t, where k represents values between 0 and N−1. The overall transmit signal 502 s(t) over the K subsets may be represented as $$s(t)=\sum_{k=0}^{NK-1}S[k]e^{j2\pi\Delta fkt}=\sum_{i=0}^{K-1}\sum_{k=0}^{N-1}S_i[k]e^{j2\pi\Delta f(Ni+k)t}.$$

To case explanation, the signal s(t) in this example may be for one target with delay to and the cyclic prefix may be larger than the delay.

The sequence used for each subset may be based at least in part on a Zadoff-Chu sequence. The Zadoff-Chu sequence may have a distinct root that results in a sequence that is distinct from other sequences. Also, when cyclically shifted versions of a Zadoff-Chu sequence are imposed upon a signal, the resulting set of signals detected at the receiver are uncorrelated with one another. Accordingly, each sequence of modulated symbols may be based at least in part on a distinct cyclic shifted version of a baseline Zadoff-Chu sequence.

In some aspects, the modulated symbols may include comb-mapped symbols, where subcarriers in the teeth of the comb pattern include modulated symbols, and subcarriers in between the teeth of the comb pattern do not include modulated symbols.

As shown in example 500, the transmit signal 502 may be reflected off of an object or surface and return as a receive signal 504. The receive signal 504 may be expressed as $y(t)=s(t-t_0)=$ $$\sum_{i=0}^{K-1}e^{j2\pi\Delta fNit}e^{-j2\pi\Delta fNit_0}\sum_{k=0}^{K-1}S_i[k]e^{j2\pi\Delta fkt}e^{-j2\pi\Delta fkt_0}.$$

Each of the K subsets are shown as 506*a*-506*d* in FIG. 5.

The wireless device may process the receive signal 504. Processing the receive signal 504 may include amplifying and filtering the receive signal 504. Processing the receive signal 504 may also include down-converting the receive signal 504, which may include converting the signal to a lower frequency signal at a lower sampling rate in order to simplify subsequent processing steps. Down-converting the receive signal 504 for each subset KA may form down-converted waveforms, and the wireless device may sum the down-converted waveforms to form a summed waveform. The processing may further include passing the summed waveform through an LPF with a bandwidth spanning the N subcarriers and sampling the summed waveform at a specified sampling rate.

For example, the wireless device may down-convert the reflected OFDM signal with multiple frequencies spaced apart by N subcarriers to form a down-converted waveform (e.g., $f_i$−ΔfNi). The wireless device may low-pass filter the down-converted waveform using a maximum bandwidth of N subcarriers (e.g., NΔf) to form a filtered signal. The resulting filtered signal may be expressed as $$r(t)=LPF_{\frac{B}{K}}\left(\sum_{i=0}^{K-1}y(t)e^{-j2\pi(iN\Delta f)t}\right)=\sum_{i=0}^{K-1}e^{-j2\pi\Delta fNit_0}\sum_{k=0}^{N-1}S_i[k]e^{j2\pi\Delta fkt}e^{-j2\pi\Delta fkt_0}.$$

The wireless device may sample the filtered signal using the maximum bandwidth to form samples. The sampling rate may be based at least in part on the N subcarriers (e.g., $$f_s=\frac{B}{K}=N\Delta f$$

samples/second). The digital samples 508*a*-508*d* may be expressed as $$r[n]=\sum_{i=0}^{K-1}e^{-j2\pi(\Delta ft_0)iN}\sum_{k=0}^{N-1}S_i[k]e^{j2\pi\frac{kn}{N}}e^{-j2\pi(\Delta ft_0)k}.$$

Note that r[n] may be of bandwidth $$\frac{B}{K}$$

and may be the summation 510 of the K subsets $S_i$, for i=0, . . . , K−1 that were transmitted at a subcarrier offset of iN Δf to cover the entire transmission bandwidth of B=NKΔf.

In some aspects, the processing may include performing an N-point FFT operation on the samples to form an N-point FFT output and concatenating K repetitions of the N-point FFT output to form an NK-length sequence. The processing may then include conjugate-multiplying the NK-length sequence with the NK-length transmit sequence $S=[S_0, S_1, \ldots S_{K-1}]$. Conjugate-multiplying involves rationalizing the numerator or denominator of a fraction and may include multiplying a signal value by its conjugate to eliminate a square root.

The range or delay of a target results in a phase ramp in frequency. The receiver may estimate and observe the phase ramp to then estimate the delay of the target. The range spectrum may be obtained by performing an FFT operation on the phase ramp. For example, the processing may include performing an N-point FFT operation on the ADC output samples r[n], concatenating K repetitions of the FFT output to form an NK-length sequence, conjugate-multiplying the NK-length sequence with the conjugate of the transmit sequence $S=[S_0, S_1, \ldots S_{K-1}]$, and then performing an NK-point FFT operation to obtain the range spectrum for the reflected OFDM signal. Note that each subset $S_i$, after down-conversion to the first N subcarriers, has a portion of the phase ramp that may be represented as $$e^{-j2\pi(\Delta f t_o)(iN+k)}.$$

To extract the phase ramp embedded over each $S_i$, the wireless device may use time domain sequences corresponding to the frequency domain sequences of $S_i$ (and their circular shifts due to the phase ramps) to be orthogonal. This can be achieved if $S_i$ are Zadoff-Chu sequences (of length N) with distinct roots based on i. While the sequences are not perfectly orthogonal, the cross-correlation may be bounded as $$\approx \frac{1}{\sqrt{N}}.$$

while orthogonal sequences are preferred, Zadoff-Chu sequences may provide flexibility in design for any general N. Therefore, $S_i[k](k=0, \ldots, N-1$ with a length N sequence) may be expressed as $S_i[k]=SZC_i[k \bmod NZC]$, where $SZC_i$=Zadoff–Chu ($root_i$, NZC), NZC is a greatest prime number less than or equal to N, and $root_i$, are unique roots over i=0 . . . . K−1. The wireless device may form an NK-length sequence M[n] as K repetitions of the sequence R[k]=FFT(r[n]), as M[k]=R[k mod N], k=0, . . . , NK−1=

$$\sum_{i=0}^{K-1} S_i[k \bmod N] e^{-j2\pi(\Delta f t_o)(Ni+(k \bmod N))}.$$

M[k] may be shown by reference number 510. Conjugate multiplying with $S=[S_0, S_1, \ldots S_{K-1}]$, the wireless device may obtain $$Z[k] = \sum_{i=0}^{K-1} S_i[k \bmod N] S^*[k] e^{-j2\pi(\Delta f t_o)(Ni+(k \bmod N))} = [Z_0 Z_1 \ldots Z_{K-1}]$$

and $$Z_i[k] = S_i[k] S_i^*[k] e^{-j2\pi(\Delta f t_0)(Ni+k)} + \sum_{\substack{m=0 \\ m\neq i}}^{K-1} S_m[k] S_i^*[k] e^{-j2\pi(\Delta f t_0)(Nm+k)}.$$

Taking an NK-point FFT of Z[k] (k=0, . . . , NK−1), the wireless device may obtain the range spectrum as $h[n]=\delta(n-\Delta f t_0 NK)+I[n]$, where $$\|I[n]\| = O\left(\frac{K-1}{\sqrt{N}}\right).$$

The output h [n] may be shown by reference number 512.

In addition to the output, the wireless device may obtain the range spectrum with full range resolution. In some aspects, processing the receive signal 504 may include processing the reflected OFDM signal with K mixers, where mixer frequencies for the K mixers are separated by N subcarriers spacing, to form K portions of a range spectrum from the reflected OFDM signal. The processing may include combining the K portions to form the range spectrum.

Accordingly, the achievable range resolution may be $$\frac{c}{2(\Delta f N K)} = \frac{c}{2B}$$

(despite a low-sampling rate of B/K), and the maximum unambiguous range may be $$\frac{c}{2\Delta f}$$

(as opposed to $$\frac{c}{2K\Delta f}$$

that is achieved in other solutions). Thus, ignoring the self-interference I, there may be no reduction in the range resolution or the maximum unambiguous range as compared to a high-sampling rate OFDM-based radar ($f_s=B=NK\Delta f$ samples/second). Furthermore, because the wireless device may achieve the resolution and range without using multiple symbols or restrictions on Δf, there may be no reduction in Doppler resolution of the maximum unambiguous Doppler velocity (as opposed to the stepped-OFDM described earlier). Similarly, there may be no reduction in the angular domain.

As indicated above, FIG. 5 is provided as an example. Other examples may differ from what is described with regard to FIG. 5.

Figure 6:
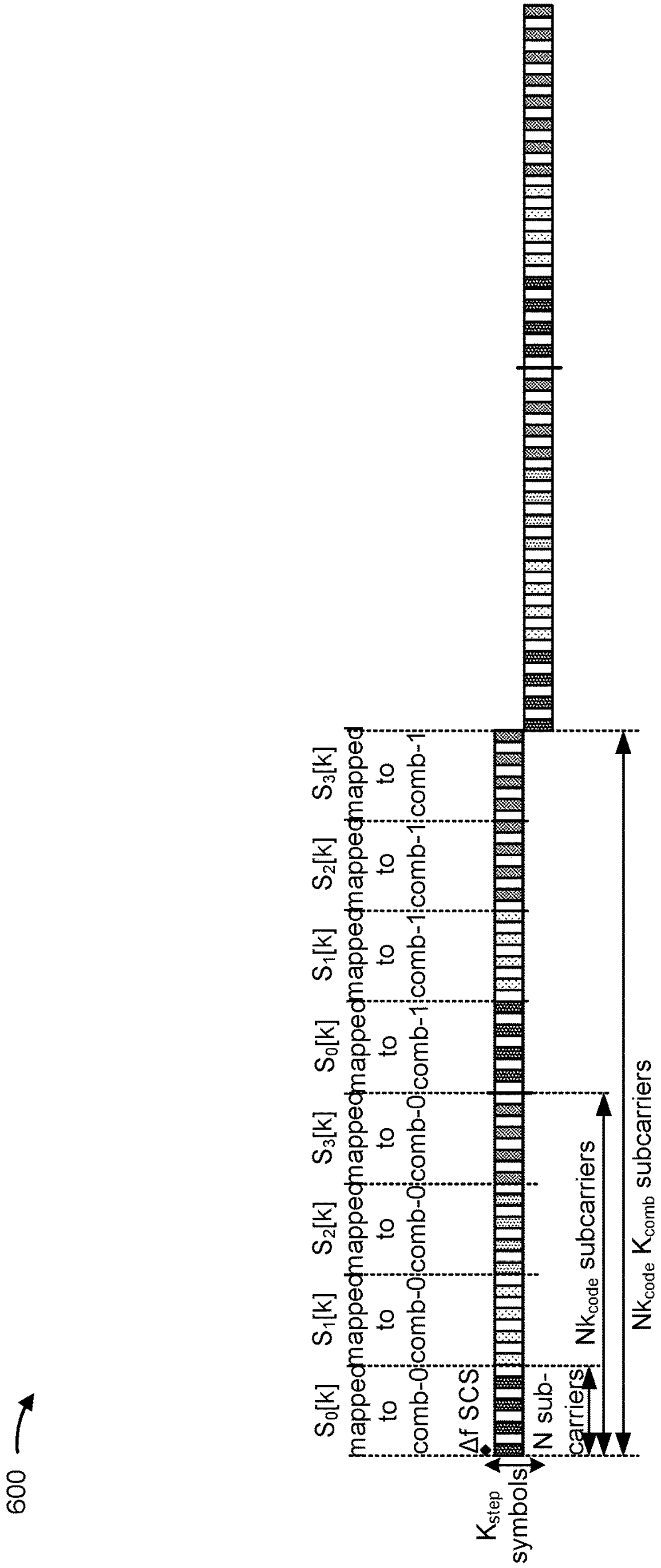
FIG. 6 is a diagram illustrating an example of aspects that may be combined with a low sampling rate aspect, in accordance with the present disclosure.

FIG. 6 is a diagram illustrating an example 600 of aspects that may be combined with a low sampling rate aspect, in accordance with the present disclosure. FIG. 6 illustrates an example transmission method to combine the low-sampling rate aspects described in FIG. 5 with alternate methods to enable a low-sampling rate. Example 600 shows the transmission methods that combine $K_{step}$=2 (stepped transmission of the block over two symbols), $K_{comb}$=2 (mapping of the symbols within a block for a given symbol on comb-0 for a first set of frequencies, and on comb-1 on the second set of frequencies), and $K_{code}$=4 (low-sampling rate aspect of the present disclosure where the sequence mapped to a particular comb in a given block is composed by concatenating four distinct sub-sequences). Such a transmission method may enable a receiver sampling rate reduction by a factor of $K_{step} \times K_{step} \times K_{code}$=16, while limiting the reduction of the maximum unambiguous Doppler by a factor of $K_{step}$=2, limiting the reduction of the maximum unambiguous range by a factor of $K_{comb}$=2, and limiting the increase in self-interference at approximate levels of $$O\left(\frac{Kcode-1}{\sqrt{N}}\right),$$

where N is the length of the sequence mapped to a particular comb in a given block.

In other words, the low-sampling rate aspects described for FIG. 5 may be combined with $K_{step}$ stepped blocks, a $K_{comb}$ frequency comb, and/or $K_{code}$ orthogonal sequences. The stepped block aspect may include processing only a subset of subcarriers during a symbol such that all subcarriers are processed within a block of the symbols.

Example 600 shows use of a frequency comb in combination with a stepped block (example 600 shows two symbols in a vertical block). The wireless device may transmit the signal over symbols spanning a total bandwidth of $N \times K \times K_{step}$ non-overlapping subcarriers, where $K_{step}$ is a quantity of symbols in a stepped block. For example, the wireless device may transmit a first set of subcarriers (NK subcarriers) over a set of subsequent symbols spanning an RF bandwidth of $N \times K \times K_{step}$ subcarriers, where the first set of subcarriers are mapped to non-overlapping subcarriers over different symbols within the RF bandwidth. In some aspects, a stepped mapping may start from a subcarrier index sym_i where sym_i=0, . . . , $K_{step}$.

As indicated above, FIG. 6 is provided as an example. Other examples may differ from what is described with regard to FIG. 6.

Figure 7:
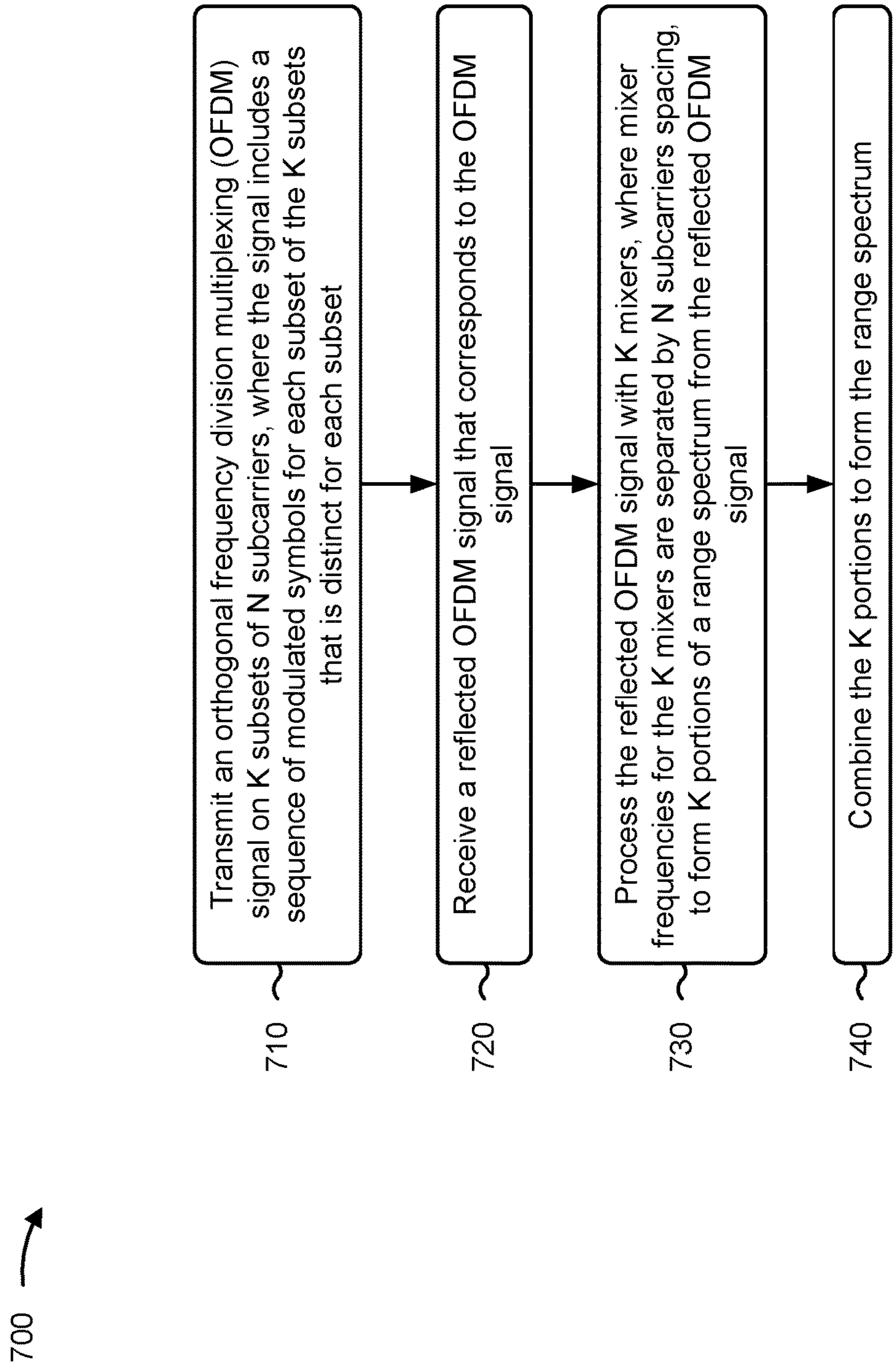
FIG. 7 is a diagram illustrating an example process performed, for example, by a wireless device, in accordance with the present disclosure.

FIG. 7 is a diagram illustrating an example process 700 performed, for example, by a wireless device, in accordance with the present disclosure. Example process 700 is an example where the wireless device (e.g., a UE 120, base station 110) performs operations associated with OFDM-based radar.

As shown in FIG. 7, in some aspects, process 700 may include transmitting an OFDM signal on K subsets of N subcarriers, where the signal includes a sequence of modulated symbols for each subset $K_i$ of the K subsets, the sequence of modulated symbols is distinct for each subset $K_i$, and i is one of K sequences (block 710). For example, the wireless device (e.g., using communication manager 140 or 150 and/or transmission component 804 depicted in FIG. 8) may transmit an OFDM signal on K subsets of N subcarriers, where the signal includes a sequence of modulated symbols for each subset $K_i$ of the K subsets, the sequence of modulated symbols is distinct for each subset $K_i$, and i is one of K sequences, as described above.

As further shown in FIG. 7, in some aspects, process 700 may include receiving a reflected OFDM signal that corresponds to the OFDM signal (block 720). For example, the wireless device (e.g., using communication manager 140 or 150 and/or reception component 802 depicted in FIG. 8) may receive a reflected OFDM signal that corresponds to the OFDM signal, as described above.

As further shown in FIG. 7, in some aspects, process 700 may include processing the reflected OFDM signal with K mixers, where mixer frequencies for the K mixers are separated by N subcarriers spacing, to form K portions of a range spectrum from the reflected OFDM signal (block 730). For example, the wireless device (e.g., using communication manager 140 or 150 and/or signal processing component 808 depicted in FIG. 8) may process the reflected OFDM signal with K mixers, where mixer frequencies for the K mixers are separated by N subcarriers spacing, to form K portions of a range spectrum from the reflected OFDM signal, as described above.

As further shown in FIG. 7, in some aspects, process 700 may include combining the K portions to form the range spectrum (block 740). For example, the wireless device (e.g., using communication manager 140 or 150 and/or signal processing component 808 depicted in FIG. 8) may combine the K portions to form the range spectrum, as described above.

Process 700 may include additional aspects, such as any single aspect or any combination of aspects described below and/or in connection with one or more other processes described elsewhere herein.

In a first aspect, each sequence of modulated symbols includes comb-mapped symbols. In a second aspect, alone or in combination with the first aspect, each sequence of modulated symbols is based at least in part on a Zadoff-Chu sequence. In a third aspect, alone or in combination with one or more of the first and second aspects, each Zadoff-Chu sequence has a distinct root. In a fourth aspect, alone or in combination with one or more of the first through third aspects, each sequence has the form $S_i[k]$, where k=0, . . . , N−1, $S_i[k]=SZC_i[k \bmod NZC]$, $SZC_i$=Zadoff-Chu (root, NZC), NZC is a greatest prime number less than or equal to N, and root, are unique roots over i=0 . . . . K−1. In a fifth aspect, alone or in combination with one or more of the first through fourth aspects, each sequence of modulated symbols is based at least in part on a distinct cyclic shifted version of a baseline Zadoff-Chu sequence.

In a sixth aspect, alone or in combination with one or more of the first through fifth aspects, processing the reflected OFDM signal includes down-converting the reflected OFDM signal for each subset $K_i$ to form down-converted waveforms, summing the down-converted waveforms to form a summed waveform, passing the summed waveform through a low-pass filter with a bandwidth spanning the N subcarriers, and sampling the summed waveform at a specified sampling rate.

In a seventh aspect, alone or in combination with one or more of the first through sixth aspects, processing the reflected OFDM signal includes down-converting the reflected OFDM signal with multiple frequencies spaced apart by N subcarriers to form a down-converted waveform, low-pass filtering the down-converted waveform using a maximum bandwidth of N subcarriers to form a filtered signal, sampling the filtered signal using the maximum bandwidth to form samples, performing an N-point FFT operation on the samples to form an N-point FFT output, concatenating K repetitions of the N-point FFT output to form an NK-length sequence, conjugate-multiplying the NK-length sequence with an NK-length transmit sequence $S=[S_0, S_1, \ldots S_{K-1}]$, and obtaining the range spectrum for the reflected OFDM signal.

In an eighth aspect, alone or in combination with one or more of the first through seventh aspects, processing the reflected OFDM signal includes converting the reflected OFDM signal to a digital signal with a sampling rate that is based at least in part on the N subcarriers.

In a ninth aspect, alone or in combination with one or more of the first through eighth aspects, transmitting the OFDM signal includes transmitting the OFDM signal over symbols in a bandwidth of $N \times K \times K_{step}$ non-overlapping subcarriers, and $K_{step}$ is a quantity of symbols in a stepped block.

In a tenth aspect, alone or in combination with one or more of the first through ninth aspects, processing the reflected OFDM signal includes conjugate-multiplying for each of the K sequences.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
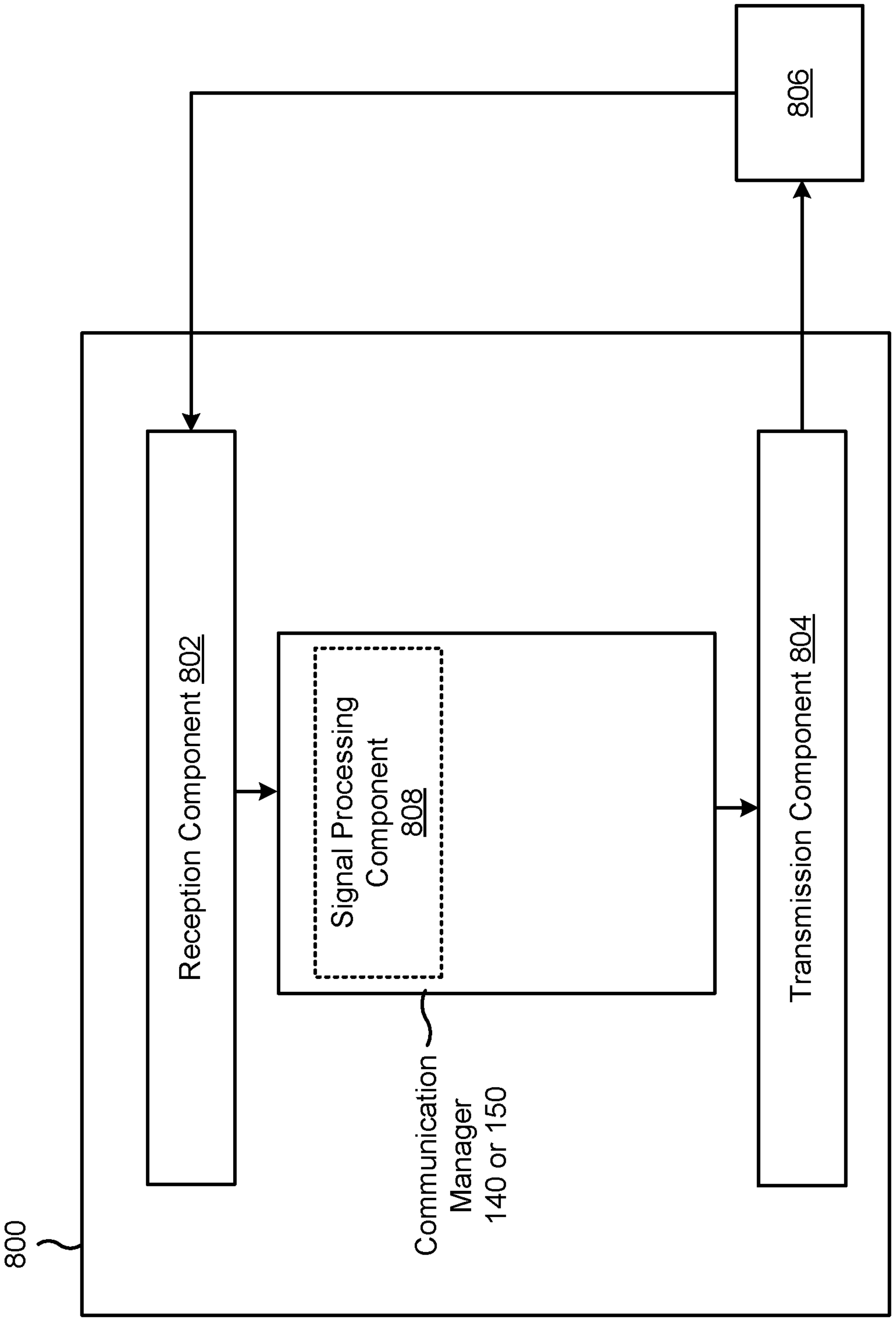
FIG. 8 is a diagram of an example apparatus for wireless communication, in accordance with the present disclosure.

FIG. 8 is a diagram of an example apparatus 800 for wireless communication. The apparatus 800 may be a wireless device (e.g., a UE 120, base station 110), or a wireless device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140 or 150. The communication manager 140 or 150 may include a signal processing component 808, among other examples.

In some aspects, the apparatus 800 may be configured to perform one or more operations described herein in connection with FIGS. 1-6. Additionally, or alternatively, the apparatus 800 may be configured to perform one or more processes described herein, such as process 700 of FIG. 7 shown in FIG. 8 may include one or more components of the wireless device described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the wireless device described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the wireless device described in connection with FIG. 2. In some aspects, the transmission component 804 may be co-located with the reception component 802 in a transceiver.

The transmission component 804 may transmit an OFDM signal on K subsets of N subcarriers, where the signal includes a sequence of modulated symbols for each subset $K_i$ of the K subsets, the sequence of modulated symbols is distinct for each subset $K_i$, and i is one of K sequences. The reception component 802 may receive a reflected OFDM signal that corresponds to the OFDM signal. The signal processing component 808 may process the reflected OFDM signal with K mixers, where mixer frequencies for the K mixers are separated by N subcarriers spacing, to form K portions of a range spectrum from the reflected OFDM signal. The signal processing component 808 may combine the K portions to form the range spectrum.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a wireless device, comprising: transmitting an orthogonal frequency division multiplexing (OFDM) signal on K subsets of N subcarriers, wherein the signal includes a sequence of modulated symbols for each subset $K_i$ of the K subsets, the sequence of modulated symbols is distinct for each subset $K_i$, and i is one of K sequences: receiving a reflected OFDM signal that corresponds to the OFDM signal: processing the reflected OFDM signal with K mixers, where mixer frequencies for the K mixers are separated by N subcarriers spacing, to form K portions of a range spectrum from the reflected OFDM signal; and combining the K portions to form the range spectrum.

Aspect 2: The method of Aspect 1, wherein each sequence of modulated symbols includes comb-mapped symbols.

Aspect 3: The method of Aspect 1, wherein each sequence of modulated symbols is based at least in part on a Zadoff-Chu sequence.

Aspect 4: The method of Aspect 3, wherein each Zadoff-Chu sequence has a distinct root.

Aspect 5: The method of Aspect 4, wherein each sequence has a form $S_i[k]$, where k=0, . . . . N−1, $S_i[k]=SZC_i[k \bmod NZC]$, $SZC_i$=Zadoff−Chu($root_i$, NZC), NZC is a greatest prime number less than or equal to N, and $root_i$, are unique roots over i=0 . . . . K−1.

Aspect 6: The method of Aspect 1, wherein each sequence of modulated symbols is based at least in part on a distinct cyclic shifted version of a baseline Zadoff-Chu sequence.

Aspect 7: The method of Aspect 1, wherein processing the reflected OFDM signal includes: down-converting the reflected OFDM signal for each subset $K_i$ to form down-converted waveforms: summing the down-converted waveforms to form a summed waveform: passing the summed waveform through a low-pass filter with a bandwidth spanning the N subcarriers; and sampling the summed waveform at a specified sampling rate.

Aspect 8: The method of Aspect 1, wherein processing the reflected OFDM signal includes: down-converting the reflected OFDM signal with multiple frequencies spaced apart by N subcarriers to form a down-converted waveform: low-pass filtering the down-converted waveform using a maximum bandwidth of N subcarriers to form a filtered signal: sampling the filtered signal using the maximum bandwidth to form samples: performing an N-point fast Fourier transform (FFT) operation on the samples to form an N-point FFT output: concatenating K repetitions of the N-point FFT output to form an NK-length sequence: conjugate-multiplying the NK-length sequence with an NK-length transmit sequence; and obtaining the range spectrum for the reflected OFDM signal.

Aspect 9: The method of Aspect 1, wherein processing the reflected OFDM signal includes converting the reflected OFDM signal to a digital signal with a sampling rate that is based at least in part on the N subcarriers.

Aspect 10: The method of Aspect 1, wherein transmitting the OFDM signal includes transmitting the OFDM signal over symbols in a bandwidth of N× K×$K_{step}$ non-overlapping subcarriers, and wherein $K_{step}$ is a quantity of symbols in a stepped block.

Aspect 11: The method of Aspect 1, wherein processing the reflected OFDM signal includes conjugate-multiplying for each of the K sequences.

Aspect 12: An apparatus for wireless communication at a device, comprising a processor: memory coupled with the processor; and instructions stored in the memory and executable by the processor to cause the apparatus to perform the method of one or more of Aspects 1-11.

Aspect 13: A device for wireless communication, comprising a memory and one or more processors coupled to the memory, the one or more processors configured to perform the method of one or more of Aspects 1-11.

Aspect 14: An apparatus for wireless communication, comprising at least one means for performing the method of one or more of Aspects 1-11.

Aspect 15: A non-transitory computer-readable medium storing code for wireless communication, the code comprising instructions executable by a processor to perform the method of one or more of Aspects 1-11.

Aspect 16: A non-transitory computer-readable medium storing a set of instructions for wireless communication, the set of instructions comprising one or more instructions that, when executed by one or more processors of a device, cause the device to perform the method of one or more of Aspects 1-11.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless device, comprising:

transmitting an orthogonal frequency division multiplexing (OFDM) signal on K subsets of N subcarriers, wherein the signal includes a sequence of modulated symbols for each subset K of the K subsets, the sequence of modulated symbols is distinct for each subset $K_i$, and i is one of K sequences;

receiving a reflected OFDM signal that corresponds to the OFDM signal;

processing the reflected OFDM signal with K mixers, where mixer frequencies for the K mixers are separated by N subcarriers spacing, to form K portions of a range spectrum from the reflected OFDM signal, wherein processing the reflected OFDM signal includes:

down-converting the reflected OFDM signal for each subset $K_i$ to form down-converted waveforms, summing the down-converted waveforms to form a summed waveform, passing the summed waveform through a low-pass filter with a bandwidth spanning the N subcarriers, and sampling the summed waveform at a specified sampling rate; and combining the K portions to form the range spectrum.

2. The method of claim 1, wherein each sequence of modulated symbols includes comb-mapped symbols.

3. The method of claim 1, wherein each sequence of modulated symbols is based at least in part on a Zadoff-Chu sequence.

4. The method of claim 3, wherein each Zadoff-Chu sequence has a distinct root.

5. The method of claim 4, wherein each sequence has a form $S_i[k]$, where k=0, . . . , N−1, $S_i[k]=SZC_i[k \bmod NZC]$, $SZC_i$=Zadoff-Chu ($root_i$, NZC), NZC is a greatest prime number less than or equal to N, and $root_i$, are unique roots over i=0 . . . K−1.

6. The method of claim 1, wherein each sequence of modulated symbols is based at least in part on a distinct cyclic shifted version of a baseline Zadoff-Chu sequence.

7. The method of claim 1, wherein down-converting the reflected OFDM signal includes:

down-converting the reflected OFDM signal with multiple frequencies spaced apart by N subcarriers to form a down-converted waveform of the down-converted waveforms;

wherein processing the reflected OFDM signal further includes:

low-pass filtering the down-converted waveform using a maximum bandwidth of N subcarriers to form a filtered signal;

sampling the filtered signal using the maximum bandwidth to form samples;

performing an N-point fast Fourier transform (FFT) operation on the samples to form an N-point FFT output;

concatenating K repetitions of the N-point FFT output to form an NK-length sequence;

conjugate-multiplying the NK-length sequence with an NK-length transmit sequence; and obtaining the range spectrum for the reflected OFDM signal.

8. The method of claim 1, wherein processing the reflected OFDM signal includes converting the reflected OFDM signal to a digital signal with a sampling rate that is based at least in part on the N subcarriers.

9. The method of claim 1, wherein transmitting the OFDM signal includes transmitting the OFDM signal over symbols in a bandwidth of $N \times K \times K_{step}$ non-overlapping subcarriers, and wherein $K_{step}$ is a quantity of symbols in a stepped block.

10. The method of claim 1, wherein processing the reflected OFDM signal includes conjugate-multiplying for each of the K sequences.

11. A wireless device for wireless communication, comprising:

one or more antennas;

one or more memories; and one or more processors, coupled to the one or more memories, configured to:

transmit an orthogonal frequency division multiplexing (OFDM) signal on K subsets of N subcarriers, wherein the signal includes a sequence of modulated symbols for each subset $K_i$ of the K subsets, the sequence of modulated symbols is distinct for each subset $K_i$, and i is one of K sequences;

receive a reflected OFDM signal that corresponds to the OFDM signal;

process the reflected OFDM signal with K mixers, where mixer frequencies for the K mixers are separated by N subcarriers spacing, to form K portions of a range spectrum from the reflected OFDM signal, wherein the one or more processors, to process the reflected OFDM signal, are configured to:

down-convert the reflected OFDM signal for each subset KA to form down-converted waveforms, sum the down-converted waveforms to form a summed waveform, pass the summed waveform through a low-pass filter with a bandwidth spanning the N subcarriers, and sample the summed waveform at a specified sampling rate; and combine the K portions to form the range spectrum.

12. The wireless device of claim 11, wherein each sequence of modulated symbols includes comb-mapped symbols.

13. The wireless device of claim 11, wherein each sequence of modulated symbols is based at least in part on a Zadoff-Chu sequence.

14. The wireless device of claim 13, wherein each Zadoff-Chu sequence has a distinct root.

15. The wireless device of claim 14, wherein each sequence has a form $S_i[k]$, where k=0, . . . , N−1, $S_i[k]=SZC_i[k \bmod NZC]$, $SZC_i$=Zadoff-Chu ($root_i$, NZC), NZC is a greatest prime number less than or equal to N, and $root_i$, are unique roots over i=0 . . . K−1.

16. The wireless device of claim 11, wherein each sequence of modulated symbols is based at least in part on a distinct cyclic shifted version of a baseline Zadoff-Chu sequence.

17. The wireless device of claim 11, wherein the one or more processors, to down-convert the reflected OFDM signal, are configured to:

down-convert the reflected OFDM signal with multiple frequencies spaced apart by N subcarriers to form a down-converted waveform of the down-converted waveforms;

wherein the one or more processors, to process the reflected OFDM signal, are configured to:

low-pass filter the down-converted waveform using a maximum bandwidth of N subcarriers to form a filtered signal;

sample the filtered signal using the maximum bandwidth to form samples;

perform an N-point fast Fourier transform (FFT) operation on the samples to form an N-point FFT output;

concatenate K repetitions of the N-point FFT output to form an NK-length sequence;

conjugate-multiply the NK-length sequence with an NK-length transmit sequence; and obtain the range spectrum for the reflected OFDM signal.

18. The wireless device of claim 11, wherein the one or more processors, to process the reflected OFDM signal, are configured to convert the reflected OFDM signal to a digital signal with a sampling rate that is based at least in part on the N subcarriers.

19. The wireless device of claim 11, wherein the one or more processors, to transmit the OFDM signal, are configured to transmit the OFDM signal over symbols in a bandwidth of $N \times K \times K_{step}$ non-overlapping subcarriers, and wherein $K_{step}$ is a quantity of symbols in a stepped block.

20. The wireless device of claim 11, wherein the one or more processors, to process the reflected OFDM signal, are configured to conjugate-multiply for each of the K sequences.

21. A non-transitory computer-readable medium storing a set of instructions for wireless communication, the set of instructions comprising:

one or more instructions that, when executed by one or more processors of a wireless device, cause the wireless device to:

transmit an orthogonal frequency division multiplexing (OFDM) signal on K subsets of N subcarriers, wherein the signal includes a sequence of modulated symbols for each subset $K_i$ of the K subsets, wherein the sequence of modulated symbols is distinct for each subset $K_i$, and wherein i is one of K sequences;

receive a reflected OFDM signal that corresponds to the OFDM signal;

process the reflected OFDM signal with K mixers, where mixer frequencies for the K mixers are separated by N subcarriers spacing, to form K portions of a range spectrum from the reflected OFDM signal, wherein the one or more instructions, to cause the wireless device to process the reflected OFDM signal, cause the wireless device to:

down-convert the reflected OFDM signal for each subset $K_i$ to form down-converted waveforms, sum the down-converted waveforms to form a summed waveform, pass the summed waveform through a low-pass filter with a bandwidth spanning the N subcarriers, and sample the summed waveform at a specified sampling rate; and combine the K portions to form the range spectrum.

22. The non-transitory computer-readable medium of claim 21, wherein the one or more instructions, that cause the wireless device to down-convert the reflected OFDM signal, cause the wireless device to:

down-convert the reflected OFDM signal with multiple frequencies spaced apart by N subcarriers to form a down-converted waveform of the down-converted waveforms;

wherein the one or more instructions, to cause the wireless device to process the reflected OFDM signal, cause the wireless device to:

low-pass filter the down-converted waveform using a maximum bandwidth of N subcarriers to form a filtered signal; and sample the filtered signal using the maximum bandwidth to form samples;

perform an N-point fast Fourier transform (FFT) operation on the samples to form an N-point FFT output;

concatenate K repetitions of the N-point FFT output to form an NK-length sequence;

conjugate-multiply the NK-length sequence with an NK-length transmit sequence; and obtain the range spectrum for the reflected OFDM signal.

23. The non-transitory computer-readable medium of claim 21, wherein the one or more instructions, that cause the wireless device to process the reflected OFDM signal, cause the wireless device to conjugate-multiply for each of the K sequences.

24. The non-transitory computer-readable medium of claim 21, wherein each sequence of modulated symbols includes comb-mapped symbols.

25. The non-transitory computer-readable medium of claim 21, wherein each sequence of modulated symbols is based at least in part on a Zadoff-Chu sequence.

26. The non-transitory computer-readable medium of claim 25, wherein each Zadoff-Chu sequence has a distinct root.

27. The non-transitory computer-readable medium of claim 26, wherein each sequence has a form $S_i[k]$, where $k=0, \ldots, N-1$, $S_i[k]=SZC_i\,[k \bmod NZC]$, $SZC_i$=Zadoff-Chu ($root_i$, NZC), NZC is a greatest prime number less than or equal to N, and $root_i$, are unique roots over $i=0 \ldots K-1$.

28. An apparatus for wireless communication, comprising:

means for transmitting an orthogonal frequency division multiplexing (OFDM) signal on K subsets of N subcarriers, wherein the signal includes a sequence of modulated symbols for each subset $K_i$ of the K subsets, wherein the sequence of modulated symbols is distinct for each subset $K_i$, and wherein i is one of K sequences;

means for receiving a reflected OFDM signal that corresponds to the OFDM signal;

means for processing the reflected OFDM signal with K mixers, where mixer frequencies for the K mixers are separated by N subcarriers spacing, to form K portions of a range spectrum from the reflected OFDM signal, wherein the means for processing the reflected OFDM signal comprises:

means for down-converting the reflected OFDM signal for each subset $K_i$ to form down-converted waveforms, means for summing the down-converted waveforms to form a summed waveform, means for passing the summed waveform through a low-pass filter with a bandwidth spanning the N subcarriers, and means for sampling the summed waveform at a specified sampling rate; and means for combining the K portions to form the range spectrum.

29. The apparatus of claim 28, wherein the means for down-converting the reflected OFDM signal includes:

means for down-converting the reflected OFDM signal with multiple frequencies spaced apart by N subcarriers to form a down-converted waveform of the down-converted waveforms;

wherein the means for processing the reflected OFDM signal further comprises:

means for low-pass filtering the down-converted waveform using a maximum bandwidth of N subcarriers to form a filtered signal; and means for sampling the filtered signal using the maximum bandwidth to form samples;

means for performing an N-point fast Fourier transform (FFT) operation on the samples to form an N-point FFT output;

means for concatenating K repetitions of the N-point FFT output to form an NK-length sequence;

means for conjugate-multiplying the NK-length sequence with an NK-length transmit sequence; and means for obtaining the range spectrum for the reflected OFDM signal.

30. The apparatus of claim 27, wherein the means for processing the reflected OFDM signal includes means for conjugate-multiplying for each of the K sequences.

* * * * *